C. F. MURDOCK.
Valves.

No. 144,692.

Patented Nov. 18, 1873.

Witnesses:
Harry King
H. H. Dodge.

Inventor.
C. F. Murdock
by Dodge & Son
Attys.

UNITED STATES PATENT OFFICE.

CHARLES F. MURDOCK, OF DETROIT, MICHIGAN.

IMPROVEMENT IN VALVES.

Specification forming part of Letters Patent No. 144,692, dated November 18, 1873; application filed November 3, 1873.

*To all whom it may concern:*

Be it known that I, CHARLES F. MURDOCK, of Detroit, in the county of Wayne and State of Michigan, have invented certain Improvements in Valves, of which the following is a specification:

My invention relates to improvements in valves; and the invention consists in providing the valve with two loose plates or face-pieces, mounted in a body-piece or carriage, by which they are supported and moved, and in arranging a brace or support between the two face-plates, with universal bearings, so as to permit each of the plates to adjust itself to its seats, and also to lift one of the plates and press it tightly against its seat, when shoved home. It also consists in providing means for rotating one or both of the face-plates automatically when the valve is opened or closed, so as to cause a uniform wear on all the bearing parts of the face, all as hereinafter more fully explained.

Figure 1:
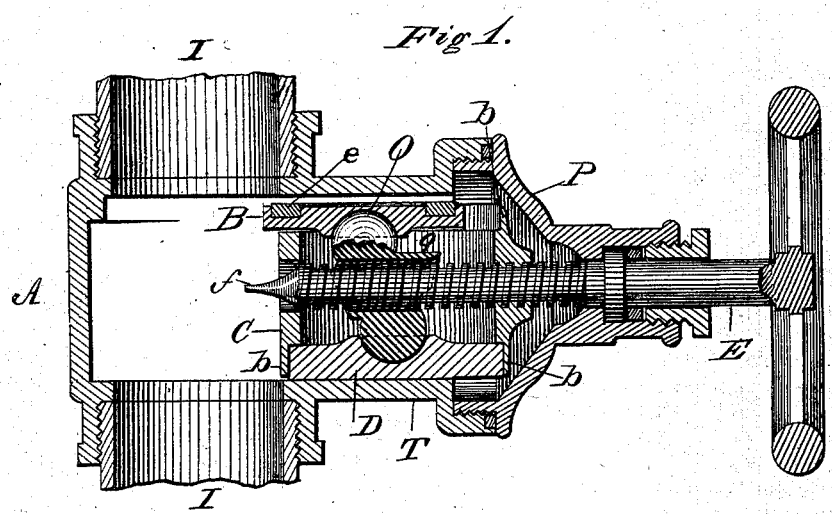
Figure 2:
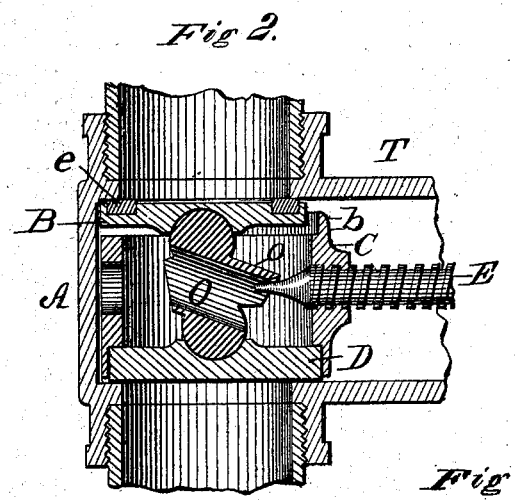
Figure 3:
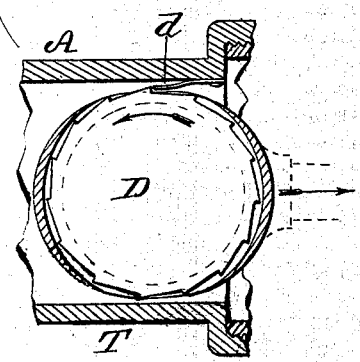
Figure 4:
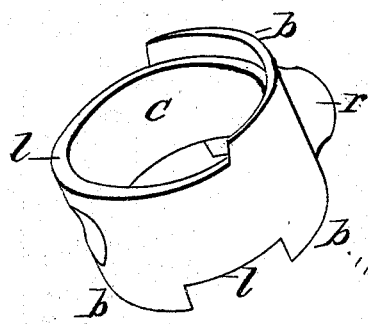

Figure 1 is a transverse section of my improved valve opened. Fig. 2 is a similar view, showing the valve closed. Figs. 3 and 4 are views of portions shown in detail.

In constructing my valve, I provide a case, A, similar, in general form, to those used for globe-valves, but having its neck T made larger, and with its interior of rectangular form and of a size to permit the valve, as a whole, to be drawn back therein, as represented in Fig. 1. Within this cavity I locate the valve, which consists of a carriage, C, which I make in the form of a ring, as shown in Fig. 4, with a hole having a screw-thread in the boss $r$, for the screw-stem E to engage in, as shown in Figs. 1 and 2, for the purpose of sliding the valve in and out, the stem E being secured in the cap-piece P, so as to prevent end movement, but allow it to turn freely therein, as shown in Fig. 1. The carriage or body C is turned off true, so as to leave a smooth flat face, $l$, both above and below, these faces serving as a seat for the valve-plates B and D, which rest loosely thereon, as shown in Figs. 1 and 2. The carriage C is provided on its upper rear side with a projection or lip, $b$, to prevent the upper plate B from slipping back thereon, and on its lower edge it has a similar lip, $b$, both front and rear, to keep the lower plate D in position, and cause it to slide with the carriage C. I also provide a brace or support, O, the ends of which are made spherical and fit into corresponding sockets on the inner sides of the plates B and D, as shown in Figs. 1 and 2, thus supporting the plates on a ball-and-socket joint, by which they are permitted to adjust themselves in any direction to their seats when driven home. This brace O has a hole through its center for the stem E to play in when the valve is drawn back, as represented in Fig. 1, this hole being made diagonal, so that the brace O shall stand inclined, as shown in Fig. 1, and on its rear side it has a projecting tube or lip, $o$, which holds it in this inclined position so long as the screw-stem E rests therein. As shown in Figs. 1 and 2, the inner end of the stem E is turned down to a taper point, $f$, and the length of the stem E is such that when the valve is closed, as shown in Fig. 2, this taper point only rests in the hole in the brace O, thereby allowing the brace to assume more nearly the vertical position, as represented in Fig. 2, to force the upper plate up against its seat $a$, as will be presently explained. The face-plates B and D are circular in form, and to prevent them from wearing unequally I cut on their edges ratchet-teeth, as shown in Fig. 3, and arrange inside of the case, at any suitable point, a pawl, $d$, to engage in one of the teeth as the carriage C, with its plates, is moved back or forth, thereby imparting to the face-plates a slight rotary movement each time the valve is operated. I have represented the pawl $d$ as being arranged at the rear portion of the neck T of the case, in which event it will rotate the plate D as it is drawn back; but it is obvious that the pawl may be arranged to turn the plate as the valve is closed, if preferred, and that this operation may be applied to one or both of the face-plates, as desired. In the present instance I have shown this idea as applied to the lower plate D only; and to make the valves still more perfect I turn an annular groove in the face of the plate B, and fill it with soft metal, as shown at $e$, Fig. 1, thus forming a soft-metal packing at the point where the plate rests against its annular rim or seat $a$, as shown in Fig. 2. Instead of soft metal, this ring $e$ may be composed of leather or any other suitable material, and it may be applied to both plates, if desired, though I do not consider it necessary.

Having thus constructed the various parts, and assembled them, as represented in Fig. 1, it will be seen that when the stem E extends through the hole in the brace O the latter is held in an inclined position, which permits the upper plate B to drop down away from the case, it then resting loosely upon the upper face $l$ of the carriage C, and that when thus arranged its front edge projects forward beyond the front edge of the lower plate D. If, now, the stem E be turned, the carriage C, with its plates B D and the brace O, will all be shoved forward into the case, and that as they approach the limit of their forward movement the projecting edge of the plate B will first strike the wall of the case, just as the brace O has reached the position where its lip or projection $o$ has come over the taper end $f$ of the stem E. Now, by continuing to turn the stem E the carriage C is shoved still further in, and carries with it the lower plate D, while the upper plate B, being already in contact with the wall at its front edge, is prevented from any further movement. This forward movement of the lower plate carries with it the lower end of the brace O, which is thereby caused to assume a nearly vertical position, and in assuming this position lifts the plate B bodily from its seat on the face $l$ of the carriage, and presses it firmly up against its seat $a$, and holds it there. As the brace O assumes more and more nearly the vertical position its bracing power or effect on the two plates B and D is constantly augmented, and thus, by a slight movement of the stem E, the valve is closed very tight. One of the most important features of my improvement is the ball-and-socket joint, by which the brace O is connected to the plates B and D, as this arrangement not only permits the valves to adjust themselves perfectly to their seats when closed, but it also admits of the plates being rotated to prevent unequal wear of their surfaces, as previously explained. It will be understood, of course, that when the plate B rests on the face $l$ of the carriage there will be a space between its rear edge and the lip $b$ to permit the carriage to continue its movement after the plate B has come in contact with the wall.

It is obvious that the valve may be used either side up, and in any position, as, when the parts are put together, the plates cannot get out of place, and I have used the terms upper and lower simply as a means of more readily explaining the construction and operation of the device.

Having thus described my invention, what I claim is—

1. The carriage C, having lips $b$ $b$, in combination with the plates B and D, constructed as described, and arranged to be operated within a valve-case, as herein set forth.

2. The plates B and D, in combination with the brace O, the parts being connected by the ball-and-socket joints, substantially as described.

3. The brace O, provided with the lip $o$, in combination with the taper point $f$ of the stem E, the said parts being arranged to operate as herein described.

4. In a slide stop-valve, a circular valve-plate provided with ratchet-teeth, and a pawl arranged to engage therewith when the valve is moved, whereby the plate has imparted to it a rotary motion, to prevent unequal wear, substantially as described.

CHARLES F. MURDOCK.

Witnesses:
W. C. DODGE,
W. W. DODGE.